(12) United States Patent
Togami et al.

(10) Patent No.: US 9,081,156 B2
(45) Date of Patent: Jul. 14, 2015

(54) SIMPLIFIED AND SHORTENED PARALLEL CABLE

(75) Inventors: Chris K. Togami, San Jose, CA (US); Gary D. Sasser, San Jose, CA (US); Frank Flens, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 1406 days.

(21) Appl. No.: 12/717,352

(22) Filed: Mar. 4, 2010

(65) Prior Publication Data

US 2011/0081119 A1    Apr. 7, 2011

Related U.S. Application Data

(63) Continuation-in-part of application No. 12/573,637, filed on Oct. 5, 2009, now Pat. No. 8,391,667.

(60) Provisional application No. 61/257,776, filed on Nov. 3, 2009, provisional application No. 61/262,049, filed on Nov. 17, 2009.

(51) Int. Cl.
| | |
|---|---|
| G02B 6/36 | (2006.01) |
| G02B 6/42 | (2006.01) |
| G02B 6/38 | (2006.01) |

(52) U.S. Cl.
CPC ............ *G02B 6/4201* (2013.01); *G02B 6/3885* (2013.01); *G02B 6/4246* (2013.01); *G02B 6/4281* (2013.01)

(58) Field of Classification Search
None
See application file for complete search history.

(56) References Cited

U.S. PATENT DOCUMENTS

| | | | |
|---|---|---|---|
| 4,636,018 | A | 1/1987 | Stillie |
| 5,214,730 | A | 5/1993 | Nagasawa et al. |
| 5,267,407 | A | 12/1993 | Bornancini |
| 5,619,604 | A | 4/1997 | Shiflett et al. |
| 5,682,450 | A | 10/1997 | Patterson et al. |

(Continued)

FOREIGN PATENT DOCUMENTS

| | | |
|---|---|---|
| CN | 102100010 A | 6/2011 |
| EP | 0439939 | 9/1995 |

(Continued)

OTHER PUBLICATIONS

Chris Togami et al., Communications Module Integrated Boot and Release Slide, U.S. Appl. No. 12/685,916, filed Jan. 12, 2010.

(Continued)

*Primary Examiner* — Hemang Sanghavi
(74) *Attorney, Agent, or Firm* — Maschoff Brennan

(57) ABSTRACT

One embodiment includes a connector comprising a connector housing, a ferrule, and a crimp ring. The connector housing has inner and outer surfaces extending between forward and rear ends of the connector housing. The inner surfaces defined a passageway extending lengthwise between the forward and rear ends. The connector housing includes at least one protrusion formed on one of the outer surfaces that is configured to engage a corresponding connector engaging structure of an alignment guide to secure the connector housing within the alignment guide. The ferrule is configured to mount upon end portions of a plurality of optical fibers of a multi-fiber communication cable. The ferrule is disposed partially within the passageway. The crimp ring encompasses the rear end of the connector housing and is configured to secure the connector to the multi-fiber communication cable.

20 Claims, 9 Drawing Sheets

(56) References Cited

U.S. PATENT DOCUMENTS

| | | | |
|---|---|---|---|
| 5,732,174 | A | 3/1998 | Carpenter et al. |
| 5,737,463 | A | 4/1998 | Weiss et al. |
| 5,743,785 | A | 4/1998 | Lundberg et al. |
| 6,085,003 | A | 7/2000 | Knight |
| 6,422,760 | B1 * | 7/2002 | Matasek et al. ............... 385/60 |
| 6,533,603 | B1 | 3/2003 | Togami |
| 6,848,836 | B2 | 2/2005 | Ueda et al. |
| 6,884,097 | B2 | 4/2005 | Ice |
| 6,886,988 | B2 | 5/2005 | Brown et al. |
| 7,114,857 | B1 | 10/2006 | Kayner et al. |
| 7,118,281 | B2 | 10/2006 | Chiu et al. |
| 7,156,562 | B2 | 1/2007 | Mazotti et al. |
| 7,217,043 | B2 | 5/2007 | Schunk |
| 7,303,336 | B2 | 12/2007 | Kayner et al. |
| 7,309,173 | B2 | 12/2007 | Epitaux et al. |
| 7,448,899 | B2 | 11/2008 | Chen et al. |
| 7,731,432 | B2 | 6/2010 | Theodoras et al. |
| 7,766,672 | B1 | 8/2010 | Chiang |
| 7,841,779 | B1 | 11/2010 | Bianchini et al. |
| 7,967,590 | B2 | 6/2011 | Grunitz et al. |
| 8,057,109 | B2 | 11/2011 | Flens et al. |
| 8,292,518 | B2 | 10/2012 | Togami et al. |
| 8,328,435 | B2 | 12/2012 | Teo et al. |
| 8,391,667 | B2 | 3/2013 | Teo et al. |
| 8,459,881 | B2 | 6/2013 | Togami et al. |
| 2002/0115342 | A1 | 8/2002 | Stricot et al. |
| 2002/0191919 | A1 * | 12/2002 | Nolan .......................... 385/78 |
| 2003/0048996 | A1 | 3/2003 | Lowe et al. |
| 2003/0072137 | A1 | 4/2003 | Yen et al. |
| 2004/0120660 | A1 | 6/2004 | Go et al. |
| 2005/0208822 | A1 | 9/2005 | Ishigami et al. |
| 2005/0254821 | A1 | 11/2005 | Theodoras |
| 2005/0259994 | A1 | 11/2005 | Zhano et al. |
| 2005/0265650 | A1 | 12/2005 | Priyadarshi et al. |
| 2006/0262026 | A1 | 11/2006 | Gainey et al. |
| 2006/0280408 | A1 * | 12/2006 | Anderson et al. ............ 385/54 |
| 2007/0058911 | A1 | 3/2007 | Yu et al. |
| 2008/0044143 | A1 * | 2/2008 | Wang et al. .................... 385/92 |
| 2008/0226239 | A1 | 9/2008 | Oki et al. |
| 2009/0253292 | A1 | 10/2009 | Wu |
| 2009/0279831 | A1 | 11/2009 | Luo et al. |
| 2009/0290619 | A1 | 11/2009 | Flens et al. |
| 2010/0080518 | A1 | 4/2010 | Teo et al. |
| 2010/0296817 | A1 | 11/2010 | Togami et al. |
| 2012/0190223 | A1 | 7/2012 | Wu |
| 2013/0178090 | A1 | 7/2013 | Teo et al. |
| 2014/0044398 | A1 | 2/2014 | Teo et al. |

FOREIGN PATENT DOCUMENTS

| | | |
|---|---|---|
| EP | 2281345 | 2/2011 |
| JP | 09-171127 | 6/1997 |
| WO | 2009143293 | 11/2009 |

OTHER PUBLICATIONS

Tat Ming Teo et al., Latching Mechanism for a Module, U.S. Appl. No. 12/573,637, filed Oct. 5, 2009.
Chris Togami et al., Electromagnetic Radiation Containment in an Optoelectronic Module, U.S. Appl. No. 12/629,650, filed Dec. 2, 2009.
The International Search Report and the Written Opinion of the International Searching Authority, International Application No. PCT/US2009/044740, date of mailing: Jun. 7, 2010.
Supplementary European Search Report completed Aug. 24, 2011 in connection with corresponding European Patent Application No. 09 75 1521 (5 pgs).
Office Action, U.S. Appl. No. 12/468,790, Feb. 3, 2011.
Notice of Allowance, U.S. Appl. No. 12/468,790, Jun. 29, 2011.
Office Action, U.S. Appl. No. 12/629,673, Oct. 5, 2011.
Notice of Allowance, U.S. Appl. No. 12/685,916, Oct. 7, 2011.
International Search Report and Written Opinon dated Nov. 23, 2013 in related PCT Application No. PCT/US2013/054407.
Office Action, U.S. Appl. No. 13/784,730, Sep. 12, 2013.

* cited by examiner

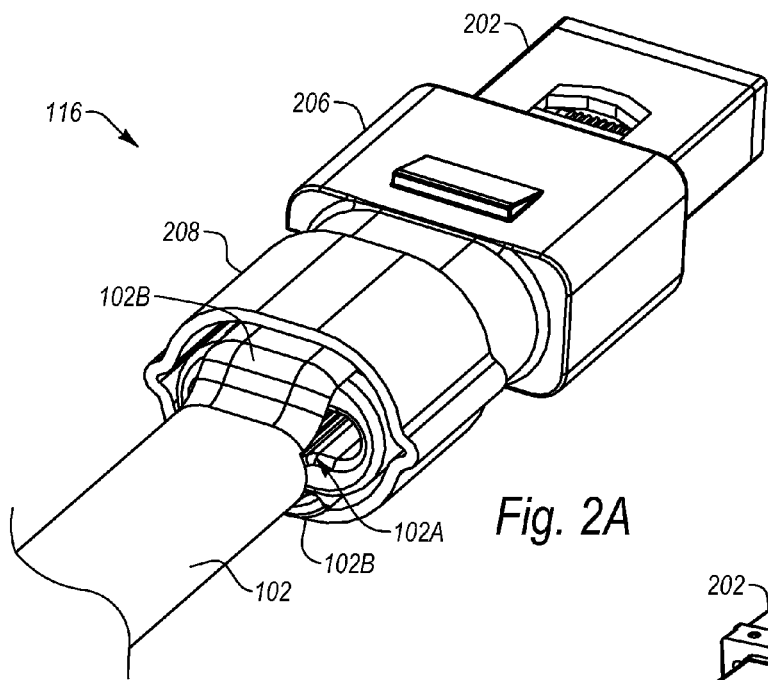
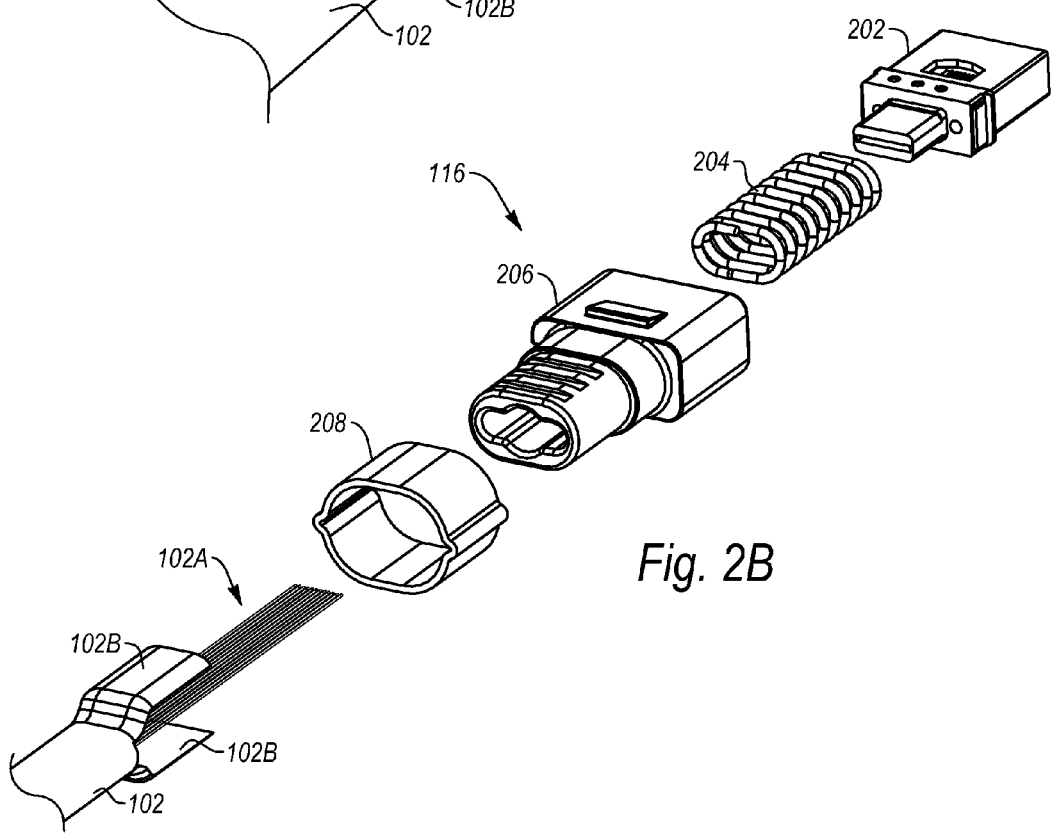
Fig. 2A
Fig. 2B

SIMPLIFIED AND SHORTENED PARALLEL CABLE

CROSS-REFERENCE TO RELATED APPLICATIONS

This application claims the benefit of and priority to U.S. Provisional Patent Application Ser. No. 61/257,776, entitled "ELECTROMAGNETIC RADIATION CONTAINMENT IN AN OPTOELECTRONIC MODULE," filed on Nov. 3, 2009, and U.S. Provisional Patent Application Ser. No. 61/262,049, entitled "ELECTROMAGNETIC RADIATION CONTAINMENT IN AN OPTOELECTRONIC MODULE," filed on Nov. 17, 2009. This application is also a continuation-in-part of U.S. patent application Ser. No. 12/573,637, entitled "LATCHING MECHANISM FOR A MODULE," filed on Oct. 5, 2009. The foregoing patent applications are hereby incorporated herein by reference in their entirety.

BACKGROUND

1. Field of the Invention

Some embodiments relate generally to optoelectronic modules. More particularly, example embodiments relate to connectors for connecting multi-fiber communication cables to optoelectronic modules.

2. Related Technology

Communication modules, such as electronic or optoelectronic transceiver or transponder modules, are increasingly used in electronic and optoelectronic communication. Some modules are pluggable, which permits the module to be inserted into and removed from a cage of a host device, such as a host computer, switching hub, network router, or switch box. Some host devices include multiple cages and can therefore accommodate multiple modules simultaneously. Each module typically communicates with a printed circuit board of the host device by transmitting and/or receiving electrical data signals to and/or from the host device printed circuit board. These electrical data signals can also be transmitted by the module outside the host device as optical and/or electrical data signals.

Active cables include communication cables with communication modules at one or both ends of the communications cables. Some communication modules include a multi-fiber push on ("MPO")-style female connector for receiving an MPO-style male connector, such as US Conec's MTP connector, that is attached to the communication cable. The MPO-style male connector is typically removable, allowing the communication cable to be removed from the communication modules. The removability of the communication cable creates the potential for eye safety issues when the communication cable is removed while optical signals are being transmitted by either of the communication modules.

Additionally, the effective module length of each communication module imposes space constraints at the front of the host devices in which the communication modules are received. The effective module length is defined as the longitudinal distance from where the communication module extends outside the host device to where the communication cable bent at its minimum fiber bend radius is normal to the length of the communication module. The MPO style male and female connectors contribute to the effective module length of each of the communication modules.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Some embodiments relate to a modified MPO-style male connector for use in permanently attaching a multi-fiber communication cable to an optoelectronic module.

One example embodiment includes a connector including a connector housing, a ferrule, and a crimp ring. The connector housing has inner and outer surfaces extending between forward and rear ends of the connector housing. The inner surfaces defined a passageway extending lengthwise between the forward and rear ends. The connector housing includes at least one protrusion formed on one of the outer surfaces. The protrusion is configured to engage a corresponding connector engaging structure of an alignment guide to secure the connector housing at least partially within the alignment guide. The ferrule is configured to mount upon end portions of a plurality of optical fibers of a multi-fiber communication cable. The ferrule is disposed partially within the passageway defined by the connector housing such that a forward portion of the ferrule is exposed through the forward end of the connector housing. The crimp ring at least partially encompasses the rear end of the connector housing and is configured to secure the connector to the multi-fiber communication cable.

Another example embodiment includes an optoelectronic module including a housing, a printed circuit board ("PCB"), a lens block, an alignment guide, and a connector. The housing has a top shell and a bottom shell. The PCB is at least partially enclosed within the housing. The lens block is enclosed within the housing. The alignment guide is aligned with the lens block. The connector is permanently attached to a multi-fiber communication cable and is permanently received within the alignment guide. The connector includes a connector housing, a ferrule, and a crimp ring. The connector housing has inner and outer surfaces extending between forward and rear ends of the connector housing. The inner surfaces define a passageway extending lengthwise between the forward and rear ends. The ferrule is configured to mount upon end portions of a plurality of optical fibers of the multi-fiber communication cable. The ferrule is disposed partially within the passageway such that a forward portion of the ferrule is exposed through the forward end of the connector housing. The crimp ring at least partially encompasses the rear end of the connector housing and an exposed jacket of the multi-fiber communication cable. The exposed jacket is at least partially disposed between the crimp ring and the rear end of the connector housing.

Yet another example embodiment includes an active cable including a multi-fiber communication cable and first and second optoelectronic modules. The multi-fiber communication cable includes a plurality of optical fibers and has first and second ends. The optoelectronic modules are attached to the first and second ends of the multi-fiber communication cable. Each optoelectronic module includes a housing, a PCB, a transmitter array, a receiver array, a lens block, an alignment guide, and a connector. The housing includes a top shell and a bottom shell. The PCB is at least partially enclosed within the housing. The transmitter array and receiver array are in electrical communication with the PCB. The lens block is enclosed within the housing. The alignment guide is configured to at least partially align the plurality of optical fibers with the transmitter array and receiver array in cooperation with the lens block and the connector. The connector is permanently attached to the multi-fiber communication cable and is permanently received within the alignment guide. The connector includes a connector housing, a ferrule, and a crimp ring. The connector housing has inner and outer surfaces extending between forward and rear ends of the connector housing. The inner surfaces define a passageway extending lengthwise between the forward and rear ends. The ferrule is mounted upon end portions of the plurality of optical fibers. The ferrule is disposed partially within the passageway. The crimp ring at least partially encompasses the rear end of the connector housing and an exposed jacket of the multi-fiber communication cable. The exposed jacket is at least partially disposed between the crimp ring and the rear end of the connector housing.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which:

FIGS. 2A-2B are a top rear perspective view and an exploded top rear perspective view of the example modified MPO-style male connector of FIG. 1C;

DETAILED DESCRIPTION OF SOME EXAMPLE EMBODIMENTS

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

1. Example Optoelectronic Module

Figure 1A:
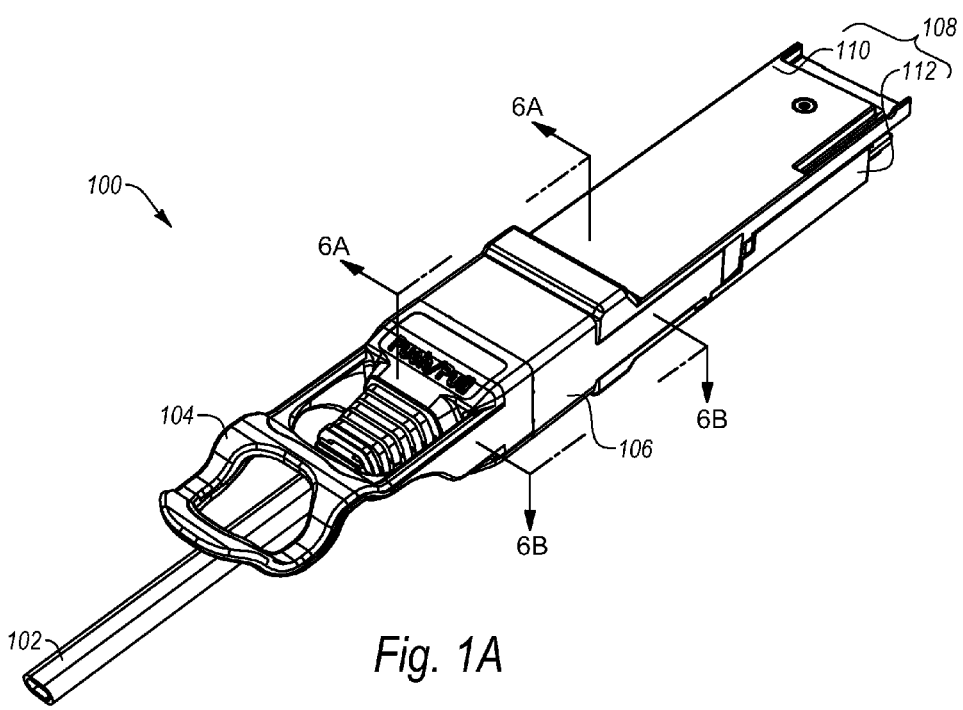
FIG. 1A is a top perspective view of an example optoelectronic module and an attached communication cable.
Figure 1B:
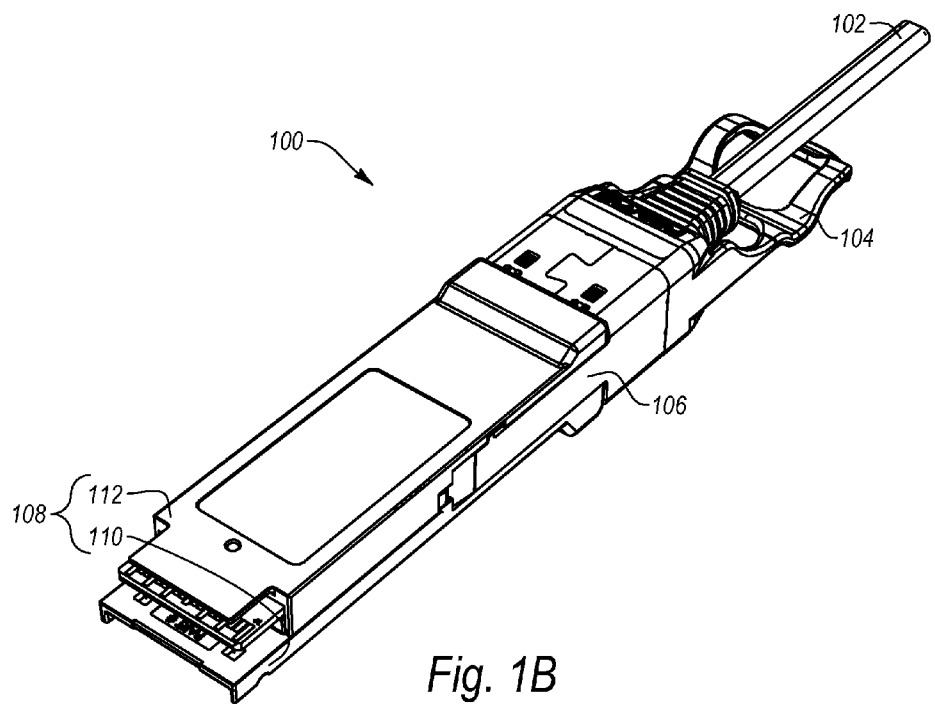
FIG. 1B is a bottom perspective view of the example optoelectronic module and attached communication cable of FIG. 1A.

Reference is first made to FIGS. 1A and 1B, which are top and bottom perspective views of an example optoelectronic module 100 for use in transmitting and receiving optical signals in connection with one or more other devices on a network, and communicating via electrical signals with a host device. As disclosed in FIGS. 1A and 1B, the optoelectronic module 100 is permanently attached to a communication cable 102, and thus the optoelectronic module 100 represents one end of an "active cable" which includes another optoelectronic module (not shown) permanently attached to the other end of the communication cable 102.

It is understood, however, that the communication cable 102 could instead be releasably connected to the optoelectronic module 100, in which case the optoelectronic module 100 would function as a stand-alone module. For example, where the communication cable 102 is a fiber-optic ribbon cable, the communication cable 102 can be terminated on one or both ends with an MPO-style male connector and the optoelectronic module 100 can include a corresponding MPO-style female connector configured to pluggably receive the MPO-style male connector.

In some embodiments, the ribbon cable 102 is a multichannel fiber-optic communication cable that includes twelve (12) fibers, four (4) of which are employed to transfer data signals in one direction, four (4) of which are employed to transfer data signals in the opposite direction, and four (4) of which are not currently in use but are available for future use.

The optoelectronic module 100 can be configured for optical signal transmission and reception at a variety of per-second data rates including, but not limited to, 40 Gbit or higher. Further, the optoelectronic module 100 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, 1610 nm, or longer wavelengths. Also, the optoelectronic module 100 can be configured to support various communication protocols including, but not limited to, INFINIBAND, Fast Ethernet, Gigabit Ethernet, 10 Gigabit Ethernet, 1x, 2x, 4x, 8x, and 10x Fibre Channel, and SONET OC-3, OC-12, OC-48, OC-192, and OC-768. Further, the optoelectronic module 100 can be configured to operate at various temperature ranges including, but not limited to, 0° C. to 70° C. and −40° C. to 85° C. In addition, although the example optoelectronic module 100 is configured to be substantially compliant with the QSFP MSA, the optoelectronic module 100 can instead be configured to assume a variety of different form factors that are substantially compliant with various transceiver and/or transponder MSAs including, but not limited to, SFF, SFP, XFP, XPAK, X2, XENPAK, or CXP.

The optoelectronic module 100 includes a boot with integrated pull tab 104 operably connected to a release slide 106 that can collectively be employed to insert the optoelectronic module 100 into a cage of a host device (not shown) and to extract the optoelectronic module 100 from the cage. The boot with integrated pull tab 104 and/or release slide 106 can be made from rubber, plastic, sheet metal, or the like. The optoelectronic module 100 further includes a housing 108 that generally includes a top shell 110 and a bottom shell 112. The top and bottom shells 110 and 112 may be formed from zinc with a copper-nickel coating, for example.

Figure 1C:
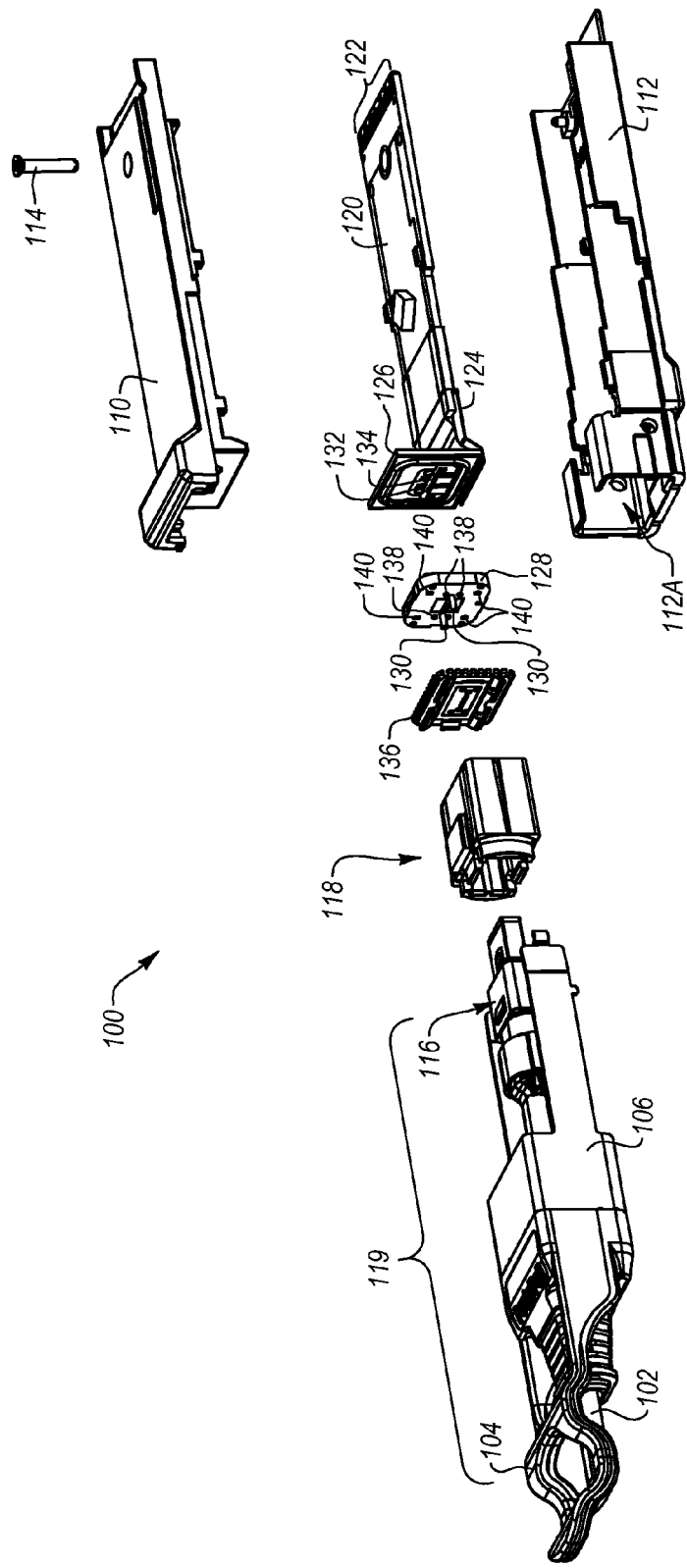
FIG. 1C is an exploded perspective view of the example optoelectronic module and attached communication cable of FIG. 1A showing an example modified MPO-style male connector and an example alignment guide.

With reference now to FIG. 1C, additional aspects of the optoelectronic module 100 are disclosed. In particular, FIG. 1C discloses that the top and bottom shells 110 and 112 of the optoelectronic module 100 are configured to be held together with a fastener 114 and partially surround a modified MPO-style male connector 116 attached to the communication cable 102. The modified MPO-style male connector 116 is configured to be permanently received within a modified MPO-style female connector, known as an alignment guide 118. The alignment guide 118 is disposed within an alignment guide receptacle 112A of the bottom shell 112. The modified MPO-style male connector 116, communication cable 102, boot with integrated pull tab 104 and release slide 106 collectively form a cable assembly 119.

The top and bottom shells 110 and 112 also generally surround a PCB 120 having an exposed edge connector 122, a flexible circuit 124, a mounting plate 126, a lens block 128, alignment pins 130, a transmitter array 132, a receiver array 134, and an EMR containment assembly 136.

The lens block 128 defines alignment protrusions 138 and alignment indentations 140. The alignment pins 130, alignment protrusion 138, and alignment indentations 140 facilitate the alignment of the alignment guide 118, the EMR containment assembly 136, the lens block 128, the transmitter array 132 and the receiver array 134. The transmitter array 132 and the receiver array 134 are physically and electrically connected to the flexible circuit 124, which is in turn physically and electrically connected to the PCB 120.

In operation, incoming optical data signals travel from the fiber-optic communication cable 102, through the modified MPO-style male connector 116, the alignment guide 118, the EMR containment assembly 136, the lens block 128, and are received by the receivers of the receiver array 134. The receivers of the receiver array 134 then convert the incoming optical data signal into electrical data signals. These electrical data signals are then passed along conductive traces (not shown) on the flexible circuit 124 to receiver circuitry (not shown) on the PCB 120. After being refined by the receiver circuitry, these electrical data signals are then passed via the edge connector 122 to the host device (not shown) into which the optoelectronic module 100 is positioned.

Similarly, outgoing electrical data signals travel via the edge connector 122 from the host device (not shown) into which the optoelectronic module 100 is positioned into the PCB 120. Transmitter circuitry (not shown) on the PCB 120 refines these electrical data signals before passing them along conductive traces (not shown) on the flexible circuit 124 to the transmitters of the transmitter array 132. The transmitters of the transmitter array 132 convert these electrical data signals into optical data signals before transmitting them through the lens block 128, the EMR containment assembly 136, the alignment guide 118, and the modified MPO-style male connector 116, and into the fiber-optic communication cable 102. In this manner, the host device (not shown) into which the optoelectronic module 100 is positioned can communicate with a remote host device (not shown).

The transmitter array 132 may be an array of optical transmitters such as vertical cavity surface emitting lasers (VCSELs), or the like. The receiver array 134 may be an array of optical receivers such as photodetectors, or the like. For example, the transmitter array 132 may be a four (4) channel VCSEL array and the receiver array 134 may be a four (4) channel PIN photodetector array. In some embodiments, only a transmitter array 132 or receiver array 134 is included in the optoelectronic module 100, such that the optoelectronic module 100 becomes only an optical transmitter or receiver, respectively. Alternately or additionally, the optoelectronic module 100 includes only a single transmitter and a single receiver, rather than a transmitter array 132 and a receiver array 134.

2. Example Connector

With reference now to FIGS. 2A-2B, additional aspects of the modified MPO-style male connector 116 are disclosed. In particular, as disclosed in FIGS. 2A-2B, the modified MPO-style male connector 116 includes a ferrule 202, a spring 204 (FIG. 2B), a connector housing 206 and a crimp ring 208.

The ferrule 202 can be made from thermo plastic resin that is highly filled with glass fibers, or other suitable material(s). The ferrule 202 is configured to be mounted upon end portions of a plurality of optical fibers 102A included in the communication cable 102. Although the ferrule 202 can be any one of a variety of different ferrules, in some embodiments, the ferrule 202 is a mechanical transfer ("MT")-type ferrule. Alternately or additionally, the ferrule 202 is a 12-optical fiber ferrule, e.g., the ferrule 202 is adapted to be mounted upon 12 optical fibers 102A.

The spring 204 can be made from one or more of stainless steel, copper, piano wire, or other suitable material(s).

The crimp ring 208 can be made from one or more of brass, copper, steel, stainless steel, or other suitable material(s). The crimp ring 208 secures the modified MPO-style male connector 116 to the communication cable 102. In this regard, the communication cable 102 includes an exposed jacket 102B. Optionally, the communication cable 102 further includes kevlar thread included as part of the exposed jacket 102B and/or separately therefrom. The modified MPO-style male connector 116 and communication cable 102 are assembled such that the exposed jacket 102B extends over the narrower rear end of the connector housing 206 with the crimp ring 208 encompassing the exposed jacket 102B and narrower rear end of the connector housing 206 as illustrated in FIG. 2A. The crimp ring 208 can then be crimped to secure the communication cable 102 to the modified MPO-style male connector 116. Alternately or additionally, epoxy, adhesive or other securing means can be employed to secure the modified MPO-style male connector 116 to the communication cable 102.

Figure 3A:
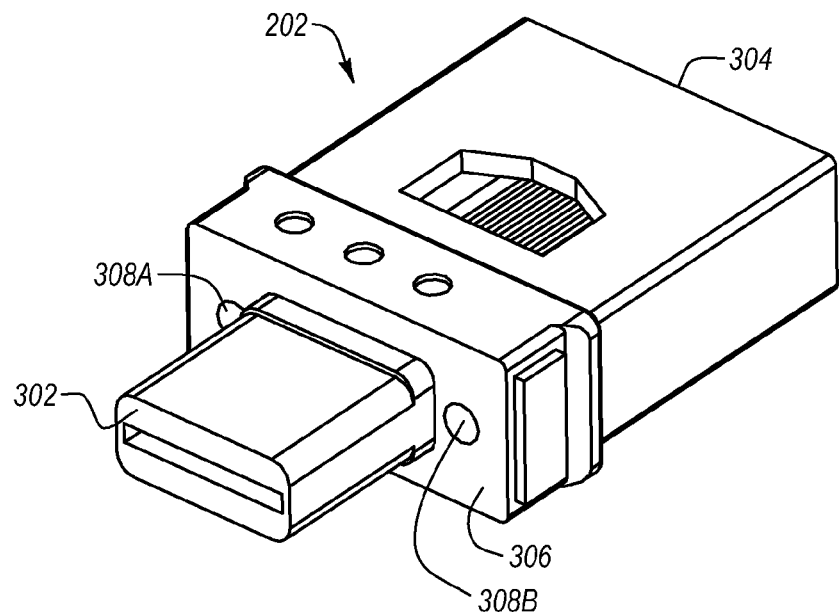
FIGS. 3A-3B are a top rear perspective view and a bottom front perspective view of an example ferrule that can be implemented in the modified MPO-style male connector of FIGS. 2A-2B.
Figure 3B:
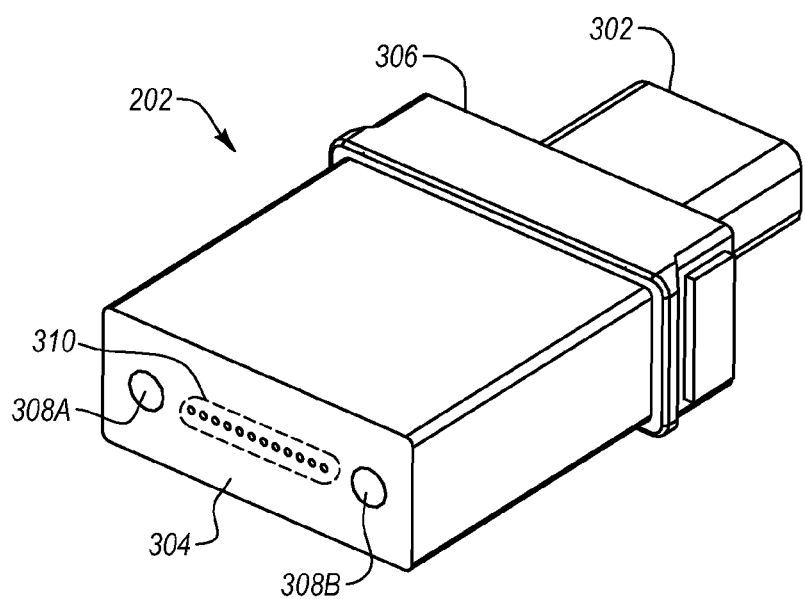

FIGS. 3A-3B disclose additional aspects of the ferrule 202. As disclosed in FIGS. 3A-3B, the ferrule 202 includes a rear portion 302 and a forward portion 304. The rear portion 302 is smaller than the forward portion 304, the ferrule 202 including a shoulder 306 between the rear portion 302 and forward portion 304. The ferrule 202 further includes alignment bores 308A, 308B, and optical fiber apertures 310 formed in the forward portion 304.

As used herein, the terms "rear" and "forward" and analogous terms as applied to the ferrule 202 or other components of the modified MPO-style male connector 116 (FIGS. 2A-2B) refer to the leading or following ends of the component as the modified MPO-style male connector 116 is inserted into the alignment guide 118 (FIG. 1C). Specifically, the term "forward" refers to the portion or end of a component of the modified MPO-style male connector 116 that leads as the modified MPO-style male connector 116 is inserted into the alignment guide 118. Analogously, the term "rear" refers to the portion or end of a component of the modified MPO-style male connector 116 that follows as the modified MPO-style male connector 116 is inserted into the alignment guide 118. Analogously, as applied to the alignment guide 118, the term "forward" refers to the portion or end of the alignment guide 118 that leads as the alignment guide 118 is inserted into the alignment guide receptacle 112A, while the term "rear" refers to the portion or end of the alignment guide 118 that follows during insertion.

With combined reference to FIGS. 2A-3B, the ends of the optical fibers 102A are received within the optical fiber apertures 310. The ends of the optical fibers 102A may extend through and beyond the optical fiber apertures 310 so as to physically contact the corresponding lenses in the lens block 128 (FIG. 1C) of the optoelectronic module 100. Alternately, the optical fibers 102A may terminate to the rear of the forward surface of the forward portion 304, the optical fiber apertures 310 providing an optical path between the ends of the optical fibers 102A and corresponding lenses in the lens block 128 (FIG. 1C). It is understood that some of the lenses in the lens block 128 are aligned with transmitters in the transmitter array 132 (FIG. 1C) and other lenses in the lens block 128 are aligned with receivers in the receiver array 134 (FIG. 1C). Thus, the optical fibers 102A are aligned with transmitters in the transmitter array 132 and receivers in the receiver array 134 via the optical fiber apertures 310 and the lenses in the lens block 128.

More generally, the modified MPO-style male connector 116, alignment guide 118 and lens block 128 of FIG. 1C cooperate to align each transmitter in the transmitter array 132 and each receiver in the receiver array 134 with a corresponding one of the optical fibers 102A.

The alignment bores 308A, 308B facilitate alignment of the ferrule 202 with the lens block 128 (FIG. 1C) such that the optical fiber apertures 310 are aligned with respective lenses in the lens block 128. In particular, the alignment pins 130 (FIG. 1C) disposed within lens block 128 extend into the alignment bores 308A, 308B to align the ferrule 202 with the lens block 128.

Figure 4A:
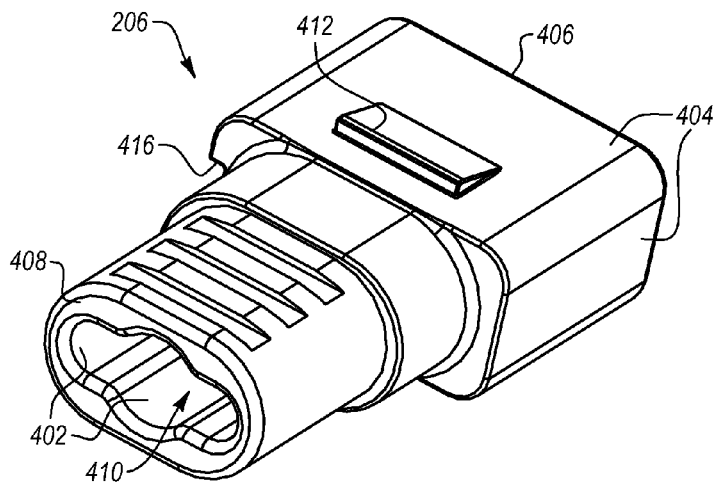
FIGS. 4A-4C are a top rear perspective view, a bottom front perspective view and a side view of an example connector housing that can be implemented in the modified MPO-style male connector of FIGS. 2A-2B.
Figure 4B:
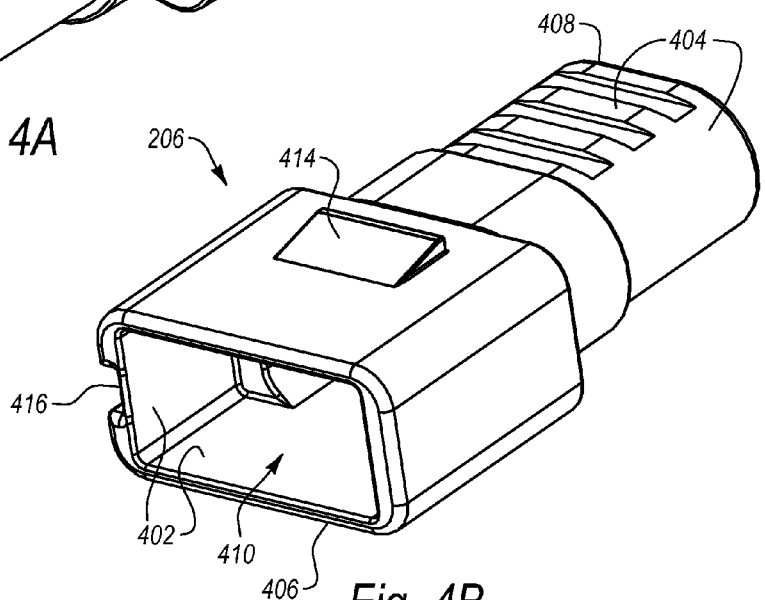
Figure 4C:
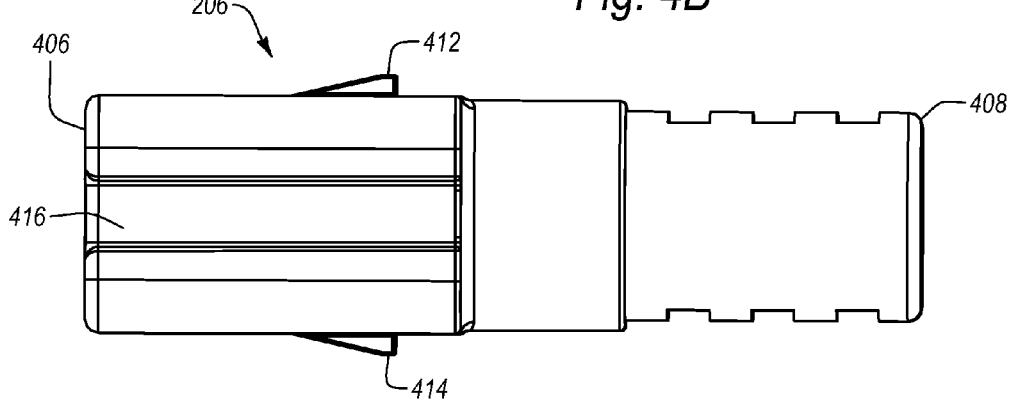

FIGS. 4A-4C disclose additional aspects of the connector housing 206. The connector housing 206 can be made from one or more of hard plastic, metal, die cast zinc or aluminum, or other suitable material(s). As disclosed in FIGS. 4A-4C, the connector housing 206 has inner and outer surfaces 402, 404. The inner and outer surfaces 402, 404 extend between opposed forward and rear ends 406, 408. The connector housing 206 defines a passageway 410 extending lengthwise between and opening through the opposed forward and rear ends 406, 408.

Figure 6A:
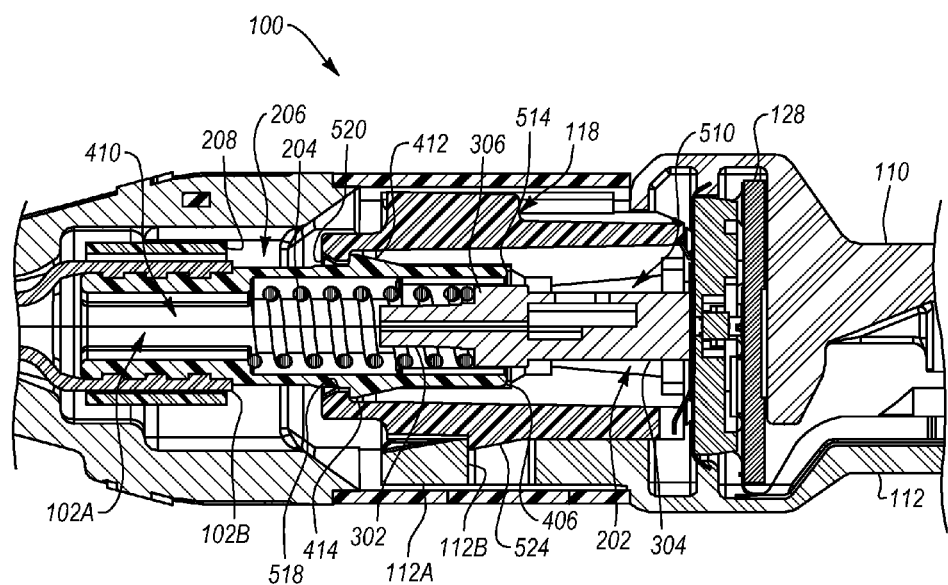
FIGS. 6A-6B are a side cross-sectional view and a top cross-sectional view of the optoelectronic module of FIG. 1A showing the assembled functionality of the modified MPO-style male connector and alignment guide of FIG. 1C.
Figure 6B:
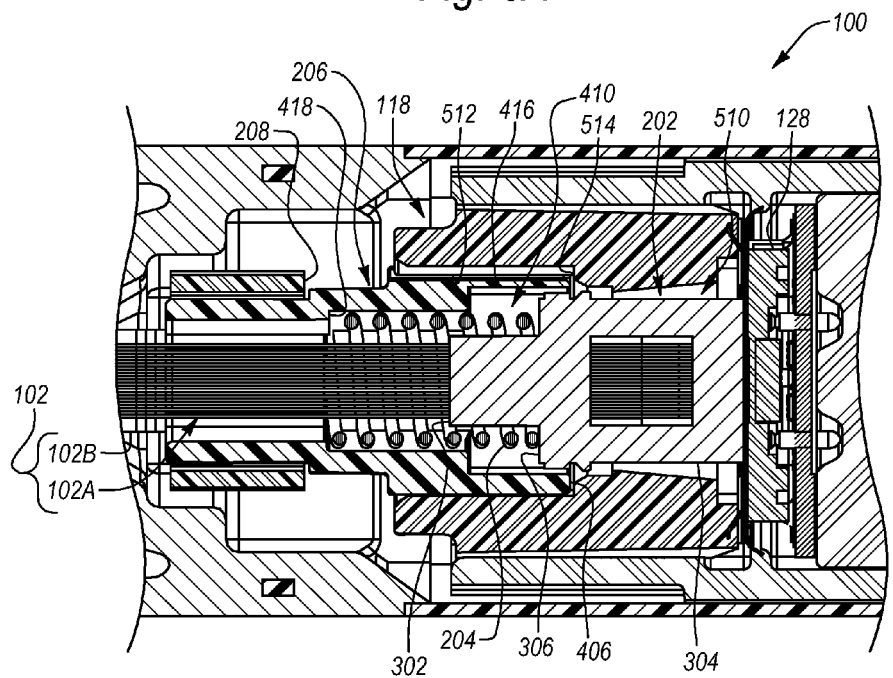

The connector housing 206 further includes a plurality of protrusions 412, 414, a channel 416, and a shoulder 418 (FIG. 6B). The protrusions 412, 414 are formed on opposed surfaces of the outer surfaces 404 and are configured to engage structures on the alignment guide 118 (FIG. 1C) to permanently attach the modified MPO-style male connector 116, and thus the communication cable 102, to the optoelectronic module 100 (FIGS. 1A-1C). Although the connector housing 206 is disclosed in FIGS. 4A-4C as including two protrusions 412, 414, in other embodiments the connector housing 206 has a single protrusion 412 or 414 or more than two protrusions 412, 414.

Figure 5A:
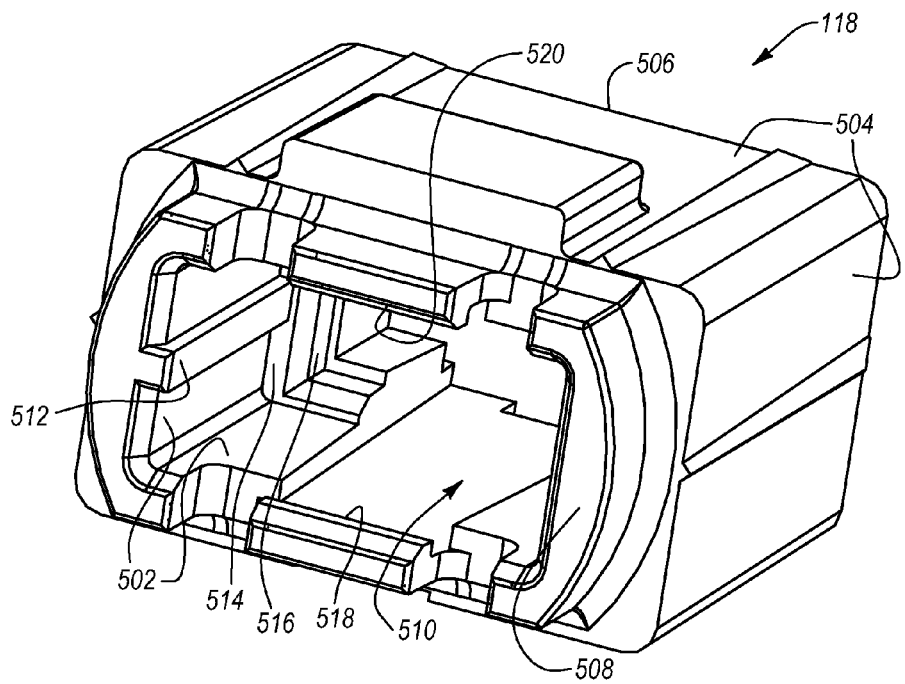
FIGS. 5A-5B are a top rear perspective view and a bottom front perspective view of the example alignment guide of FIG. 1C.
Figure 5B:
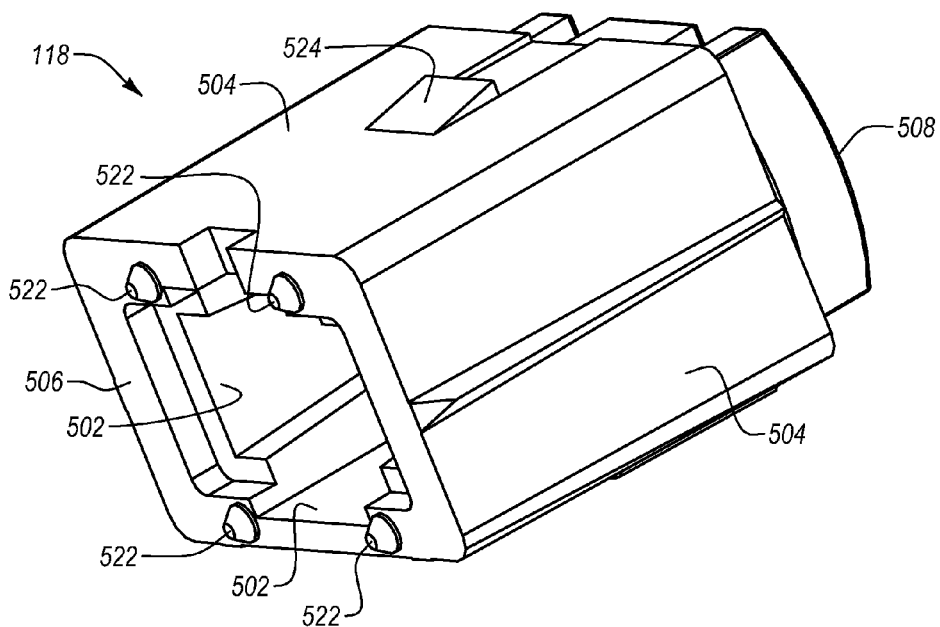

The channel 416 is formed lengthwise along one of the outer surfaces 404 and is generally configured to prevent incorrect insertion of the modified MPO-style male connector 116 into the alignment guide 118 (FIG. 1C), as discussed in greater detail with respect to FIGS. 5A-5B.

FIGS. 5A-5B disclose additional aspects of the alignment guide 118. As disclosed in FIGS. 5A-5B, the alignment guide 118 has inner and outer surfaces 502, 504. The inner and outer surfaces 502, 504 extend between opposed forward and rear ends 506, 508. The alignment guide 118 defines a passageway 510 extending lengthwise between and opening through the opposed forward and rear ends 506, 508.

The alignment guide 118 further includes a guide rail 512 (FIG. 5A), first and second shoulders 514, 516 (FIG. 5A), connector engaging structures 518, 520 (FIG. 5A), alignment protrusions 522 (FIG. 5B) and module engaging structure 524 (FIG. 5B). The guide rail 512 is formed lengthwise on one of the inner surfaces 502 and partially extends into the passageway 510 of the alignment guide 118. The guide rail 512 is complementary to the channel 416 (FIGS. 4A-4C) of the connector housing 206 (FIGS. 4A-4C) and cooperates with the channel 416 to prevent the modified MPO-style male connector 116 (FIGS. 2A-2B) from being inserted into the alignment guide 118 passageway 510 unless the modified MPO-style male connector 116 is oriented such that the channel 416 can receive the guide rail 512.

It will be appreciated that the positions of the guide rail 512 and the channel 416 (FIGS. 4A-4C) can be switched. For example, the guide 512 can be formed on one of the outer surfaces 404 of the connector housing 206 (FIGS. 4A-4C) while the channel 416 is formed on a corresponding one of the inner surfaces 502 of the alignment guide 118.

The guide rail 512 and channel 416 (FIGS. 4A-4C) represent one example of a structural implementation of a means for preventing improper insertion of the modified MPO-style male connector 116 (FIGS. 2A-2B) into the alignment guide 118 passageway 510. The guide rail 512 and channel 416 exploit lateral asymmetry of the passageway 510 and connector housing 206 (FIGS. 4A-4C) to prevent improper insertion of the modified MPO-style male connector 116. More generally, means for preventing improper insertion of the modified MPO-style male connector 116 into the passageway 510 can exploit lateral asymmetry of the passageway 510 and connector housing 206, vertical asymmetry of the passageway 510 and connector housing 206, or any combination thereof.

The first and second shoulders 514, 516 are formed on the inner surfaces 502 around the passageway 510 and constrain forward displacement of the modified MPO-style male connector 116 (FIGS. 2A-2B) with respect to the alignment guide 118 after being inserted into the alignment guide 118.

The connector engaging structures 518, 520 are formed on the rear end 508 of the alignment guide 118. The connector engaging structures 518, 520 are configured to engage the protrusions 412, 414 (FIGS. 4A-4C) of the connector housing 206 (FIGS. 4A-4C) and to constrain rearward displacement of the modified MPO-style male connector 116 (FIGS. 2A-2B) with respect to the alignment guide 118 after being inserted into the alignment guide 118.

The alignment protrusions 522 are formed on the forward end 506. The alignment protrusions 522 are configured to be received in the alignment indentations 140 (FIG. 1C) of the lens block 128 (FIG. 1C) to align the alignment guide 118 with the lens block 128.

The protrusion 524 is formed on one of the outer surfaces 504. The module engaging structure 524 is configured to permanently attach the alignment guide 118 to the optoelectronic module 100 (FIGS. 1A-1C), as described in greater detail below.

FIGS. 6A-6B disclose additional details regarding the interaction of the communication cable 102, modified MPO-style male connector 116, alignment guide 118, and other components of the optoelectronic module 100. FIG. 6A discloses a cross-sectional side view of a portion of the optoelectronic module 100 as generally indicated by the cutting plane lines 6A of FIG. 1A. FIG. 6B discloses a cross-sectional top view of a portion of the optoelectronic module 100 as generally indicated by the cutting plane lines 6B of FIG. 1A.

As disclosed in FIG. 6A, the bottom shell 112 includes a recess 112B formed in the alignment guide receptacle 112A. The module engaging structure 524 of the alignment guide 118 is configured to engage the recess 112B and secure the alignment guide 118 within the alignment guide receptacle 112A after the alignment guide 118 has been inserted into the alignment guide receptacle 112A. In some embodiments, the configurations of alignment guide 118 and bottom shell 112 permit the alignment guide 118 to snap into place during assembly within the alignment guide receptacle 112A without the use of adhesives or epoxies, thus enabling a simpler assembly process compared to some assembly processes that require adhesives or epoxies. Accordingly, in some embodiments the alignment guide 118 is secured within the alignment guide receptacle 112A via mechanical interference without using adhesives or epoxies.

With continued reference to FIG. 6A, the ferrule 202 and connector housing 206 of the modified MPO-style male connector 116 (FIGS. 2A-2B) are at least partially received within the passageway 510 of alignment guide 118. The modified MPO-style male connector 116 is permanently secured within the alignment guide 118 by the protrusions 412, 414 of connector housing 206 which engage corresponding connector engaging structures 518, 520 of the alignment guide 118. The protrusions 412, 414 and connector engaging structures 518, 520 cooperate to permanently prevent removal of the modified MPO-style male connector 116 from the alignment guide 118.

In some embodiments, the optoelectronic module 100 is built up to be substantially assembled except for connecting to the cable assembly 119 (FIG. 1C). Prior to connecting the cable assembly 119, the optoelectronic module 100 can be completely tested to ensure proper operation without the components of the cable assembly 119 getting in the way. After testing, the cable assembly 119 is snapped into place. In some embodiments, snapping the cable assembly 119 into place involves inserting the modified MPO-style male connector 116 (FIGS. 2A-2B) into the passageway 510 until the protrusions 412, 414 and connector engaging structures 518, 520 engage each other, followed by sliding the boot with integrated pull tab 104 and release slide 106 up the communication cable 102 onto the rear end of the optoelectronic module 100.

FIG. 6B discloses the interaction of the guide rail 512 of the alignment guide 118 with the channel 416 formed on one of the outer surfaces 404 of the connector housing 206. In particular, the guide rail 512 is received within the channel 416. It will be appreciated, however, that if a user were to attempt to insert the modified MPO-style male connector 116 (FIGS. 2A-2B) including connector housing 206 into the passageway 510 in any orientation other than that shown in FIG. 6B, the absence of a channel 416 on all of the outer surfaces 404 except for one would effectively prevent the modified MPO-style male connector 116 from being fully inserted into the passageway 510 unless the modified MPO-style male connector 116 is oriented such that the channel 416 can receive the guide rail 512.

As disclosed in FIGS. 6A-6B, the ferrule 202 and the forward end 406 of connector housing 206 are disposed within the passageway 510 of alignment guide 118. In the illustrated embodiment, the first shoulder 514 formed in the passageway 510 defines an aperture having a perimeter that is smaller than the outer perimeter of the forward end 406 of the connector housing 206. As such, the first shoulder 514 prevents the connector housing 206 from moving further forward than the first shoulder 514, thereby constraining forward displacement of the modified MPO-style male connector 116 (FIGS. 2A-2B) with respect to the alignment guide 118 after being inserted into the alignment guide 118.

In the illustrated embodiment, the rear portion 302 of the ferrule 202 is disposed within the passageway 410 of connector housing 206. The spring 204 is also disposed within the passageway 410, the forward end of the spring 204 partially encompassing the rear portion 302 of the ferrule 202 and being disposed against the ferrule 202 shoulder 306. The connector housing 206 shoulder 418 formed within the passageway 410 provides a surface against which the rear end of the spring 204 is disposed. In some embodiments, after inserting the modified MPO-style male connector 116 (FIGS. 2A-2B) into the passageway 510 of alignment guide 118, the spring 204 is compressed such that the spring 204 biases the ferrule 202 against the lens block 128.

In some embodiments, the aggregate cost of the spring 204, connector housing 206, crimp ring 208, and alignment guide 118 (FIG. 1C) is approximately $0.25 in United States Currency. More generally, the aggregate cost of these components is less than $0.50. In contrast, some MPO-style male connectors, such as the MPO-style male connector marketed by US Conec as the "MTP connector," are licensed parts that cost significantly more than $0.50, such that inclusion of US Conec's MTP connector in the optoelectronic module 100 of FIGS. 1A-1C would significantly increase the cost of the optoelectronic module 100 as compared to using the modified MPO-style male connector 116 and alignment guide 118.

Alternately or additionally, the modified MPO-style male connector 116 (FIGS. 2A-2B) implements a standard 12-optical fiber MT-type ferrule without any modifications.

As already indicated above, the alignment guide 118 (FIGS. 5A-5B) is snapped into place within the alignment guide receptacle 112A (FIG. 1C) without the use of adhesives or epoxies. Accordingly, the alignment guide 118 reduces assembly times associated with the use of adhesives or epoxies. Further, the alignment guide 118 permits the optoelectronic module 100 (FIGS. 1A-1C) to be built up to be substantially assembled except for connecting to the cable assembly 119 (FIG. 1C), at which point the optoelectronic module 100 can connected to test equipment through the alignment guide 118 for testing. After testing, the cable assembly 119 is snapped into place.

Moreover, because the modified MPO-style male connector 116 permanently attaches the communication cable 102 to the optoelectronic module 100, there is no likelihood that the communication cable 102 will be removed from the optoelectronic module 100, thereby possible directing optical signals travelling thereon into a person's eyes. As such, some embodiments of the optoelectronic module 100 can be implemented without other more expensive eye safety features that are often implemented in many optoelectronic modules with removable communication cables.

Figure 7:
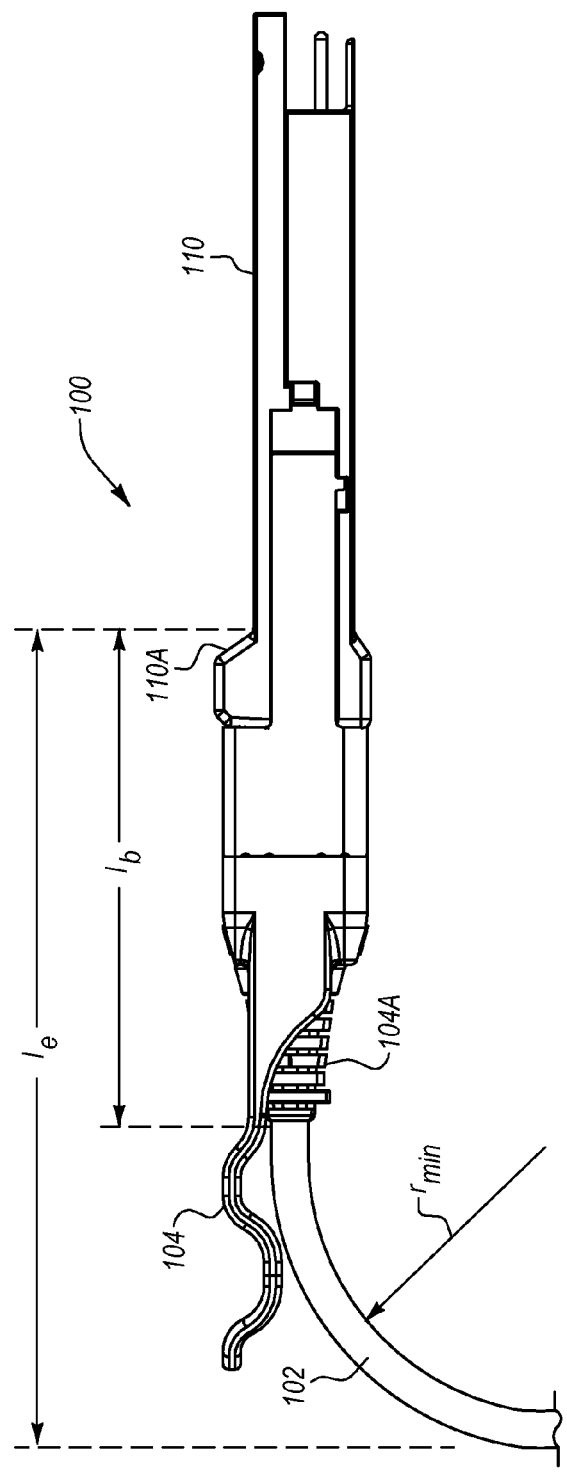
FIG. 7 is a side view of the example optoelectronic module and attached communication cable of FIG. 1A.

Additionally, in some embodiments, the optoelectronic module 100 including the modified MPO-style male connector 116 is shorter in length than comparable optoelectronic modules that implement standard MPO-style male connectors. For instance, FIG. 7 illustrates a side view of the optoelectronic module 100 with the communication cable 102 bent to the minimum fiber bend radius $r_m$ of the optical fibers 102A (FIGS. 2A-2B). In some embodiments, the minimum fiber bend radius $r_m$ of the optical fibers 102A is approximately 25 millimeters ("mm").

In the illustrated embodiment, the effective module length $l_e$ of the optoelectronic module 100 is approximately 70 mm, although other optoelectronic modules in which some embodiments are implemented can be longer or shorter than 70 mm. The effective module length $l_e$ is defined as the longitudinal distance from where the optoelectronic module 100 extends outside of a host device to where the communication cable 102 bent at its minimum fiber bend radius is normal to the length of the optoelectronic module 100. In the illustrated embodiment of FIG. 7, a shoulder 110A formed in the top shell 110 limits the extent to which the optoelectronic module 100 can be received into a host device, and thus defines a starting (or ending) location for determining the effective module length $l_e$.

In the example of FIG. 7, the effective module length $l_e$ of the optoelectronic module 100 is approximately 8 mm less than the effective module length of comparable optoelectronic modules that implement standard MPO-style male connectors, such as US Conec's MTP connector. Accordingly, even in some embodiments of the optoelectronic module 100 that have an effective module length $l_e$ that is greater or less than 70 mm, the effective module length $l_e$ of these embodiments of the optoelectronic module 100 may nevertheless be approximately 8 mm less than the effective module lengths of otherwise comparable optoelectronic modules that implement standard MPO-style male connectors.

It will be appreciated, with the benefit of the present disclosure, that the effective module length $l_e$ may vary depending on the type of communications cable 102 used and its minimum fiber bend radius $r_{min}$. Thus, FIG. 7 further illustrates a length $l_b$ defined as the longitudinal distance from where the optoelectronic module 100 extends outside of a host device to the line-side end of a boot portion 104A of the boot with integrated pull tab 104. In some embodiments, the length $l_b$ is approximately 42.4 mm.

3. Another Example Optoelectronic Module

Figure 8A:
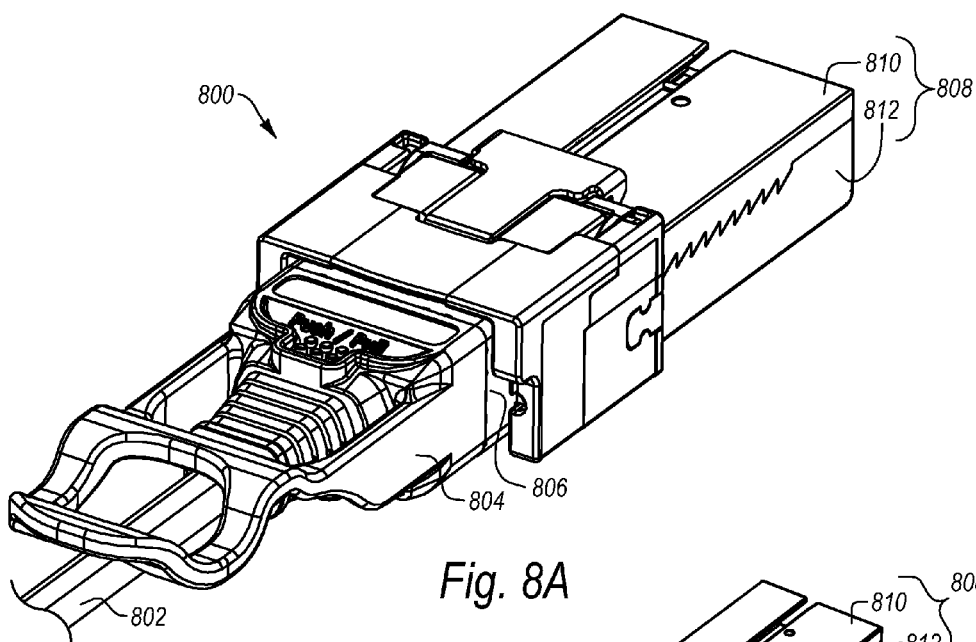
FIGS. 8A and 8B are a top rear perspective view and exploded top rear perspective view of another example optoelectronic module and attached communication cable.

With reference now to FIG. 8A, another example optoelectronic module 800 is disclosed. As disclosed in FIG. 8A, the optoelectronic module 800 is permanently attached to a communication cable 802, and thus the optoelectronic module 800 represents one end of an "active cable" which includes another optoelectronic module (not shown) permanently attached to the other end of the communication cable 802. It is understood, however, that the optoelectronic module 800 could instead be configured as a stand-alone module.

The communication cable 802 is a multichannel fiber-optic communication cable that includes twenty four (24) fibers, with twelve (12) of the fibers being employed to transfer data signals in one direction, and the other twelve (12) fibers being employed to transfer data signals in the opposite direction.

The optoelectronic module 800 can be configured for optical signal transmission and reception at a variety of per-second data rates including, but not limited to, 150 Gbit or higher. Further, the optoelectronic module 800 can be configured for optical signal transmission and reception at various wavelengths, supporting various communication protocols, and operating at various temperature ranges including those listed above in connection with the optoelectronic module 100. In addition, although the example optoelectronic module 800 is configured to be substantially compliant with the CXP MSA, the optoelectronic module 800 can instead be configured to assume a variety of different form factors that are substantially compliant with various transceiver and/or transponder MSAs including, but not limited to, SFF, SFP, XFP, XPAK, X2, XENPAK, or QSFP.

The optoelectronic module 800 includes a boot with integrated pull tab 804 and a release slide 806 that can collectively be employed to insert the optoelectronic module 800 into a cage of a host device (not shown) and to extract the optoelectronic module 800 from the cage. The optoelectronic module 800 further includes a housing 808 that generally includes a top shell 810 and a bottom shell 812 that can be formed from similar materials as the top and bottom shells 110 and 112, for example.

Figure 8B:
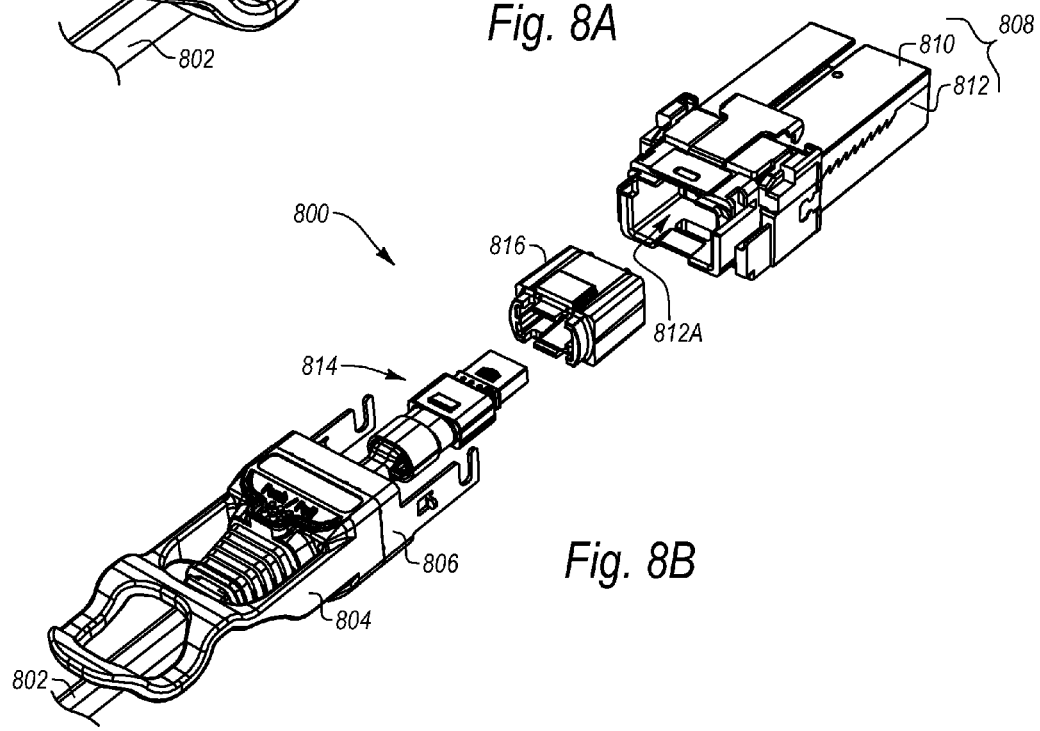

With additional reference to FIG. 8B, additional aspects of the optoelectronic module 800 are disclosed. In particular, FIG. 8B discloses that the top and bottom shells 810, 812 of the optoelectronic module 800 are configured to partially surround a modified MPO-style male connector 814 permanently attached to the communication cable 802. The modified MPO-style male connector 814 is permanently received within a modified MPO-style female connector, known as alignment guide 816. The alignment guide 816 is configured to be permanently received within an alignment guide receptacle 812A of the bottom shell 812.

In some embodiments, the modified MPO-style male connector 814 and alignment guide 816 implemented in the optoelectronic module 800 of FIGS. 8A-8B are analogous or substantially identical to the modified MPO-style male connector 116 and alignment guide 118 implemented in the optoelectronic module 100. For instance, the modified MPO-style male connector 814 may include a spring, connector housing, and crimp ring that are substantially identical to the spring 204, connector housing 206 and crimp ring 208 of the modified MPO-style male connector 116. In some embodiments, however, the modified MPO-style male connector 814 includes a 24-optical fiber MT-type ferrule, rather than a 12-optical fiber MT-type ferrule included in some embodiments of the modified MPO-style male connector 116. Thus, one or more of the ferrule, spring, connector housing or crimp ring of the modified MPO-style male connector 814 and/or the alignment guide 816 can be adapted to suit a particular application. Accordingly, the modified MPO-style male connectors 116, 814 and alignment guides 118, 816 are not limited to a particular optoelectronic module 100, 800 form factor, but can be implemented in optoelectronic modules of a variety of different form factors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A connector comprising:
    a connector housing having inner and outer surfaces extending between forward and rear ends of the connector housing, wherein the inner surfaces define a passageway extending lengthwise between the forward and rear ends and the connector housing includes at least one protrusion formed on one of the outer surfaces, the at least one protrusion configured to engage a corresponding connector engaging structure of an alignment guide to secure the connector housing at least partially within the alignment guide;

a ferrule for mounting upon end portions of a plurality of optical fibers of a multi-fiber communication cable, the ferrule disposed partially within the passageway defined by the connector housing such that a forward portion of the ferrule is exposed through the forward end of the connector housing; and a crimp ring at least partially encompassing the rear end of the connector housing and configured to secure the connector to the multi-fiber communication cable.

2. The connector of claim 1, further comprising a spring disposed within the passageway, the spring having a forward end and a rear end, the forward end of the spring partially encompassing a rear portion of the ferrule, the spring configured to bias the ferrule forward.

3. The connector of claim 1, wherein the at least one protrusion comprises two protrusions, one each formed on opposed surfaces of the outer surfaces.

4. The connector of claim 1, wherein the alignment guide has inner and outer surfaces extending between forward and rear ends of the alignment guide, wherein the inner surfaces define a second passageway extending lengthwise between the forward and rear ends of the alignment guide, the connector being partially disposed within the second passageway.

5. The connector of claim 4, further comprising means for preventing improper insertion of the connector into the alignment guide.

6. The connector of claim 5, wherein the means for preventing improper insertion of the connector into the alignment guide comprises:
a guiderail formed lengthwise along at least a portion of one of the inner surfaces of the alignment guide; and
a channel formed lengthwise along at least a portion of a corresponding one of the outer surfaces of the connector housing, the channel configured to receive the guiderail.

7. The connector of claim 5, wherein the means for preventing improper insertion of the connector into the alignment guide comprises:
a guiderail formed lengthwise along at least a portion of one of the outer surfaces of the connector housing; and
a channel formed lengthwise along at least a portion of a corresponding one of the inner surfaces of the alignment guide, the channel configured to receive the guiderail.

8. The connector of claim 1, wherein the ferrule comprises a 12-optical fiber mechanical transfer ("MT") ferrule.

9. An optoelectronic module comprising:
a housing comprising a top shell and a bottom shell;
a printed circuit board at least partially enclosed within the housing;
a lens block enclosed within the housing;
an alignment guide aligned with the lens block; and
a connector permanently attached to a multi-fiber communication cable, the connector comprising:
 a connector housing having inner and outer surfaces extending between forward and rear ends of the connector housing, wherein the inner surfaces define a passageway extending lengthwise between the forward and rear ends, and the connector housing is configured to be permanently received within the alignment guide such that the connector is permanently received within the alignment guide;
 a ferrule for mounting upon end portions of a plurality of optical fibers of the multi-fiber communication cable, the ferrule disposed partially within the passageway defined by the connector housing such that a forward portion of the ferrule is exposed through the forward end of the connector housing; and
 a crimp ring at least partially encompassing the rear end of the connector housing and an exposed jacket of the multi-fiber communication cable, the exposed jacket being at least partially disposed between the crimp ring and the rear end of the connector housing.

10. The optoelectronic module of claim 9, wherein the connector housing includes two protrusions formed on opposing surfaces of the outer surfaces, the two protrusions configured to engage corresponding connector engaging structures of the alignment guide to permanently secure the connector housing at least partially within the alignment guide.

11. The optoelectronic module of claim 9, wherein the alignment guide is secured within the module via mechanical interference without the use of adhesive or epoxy.

12. The optoelectronic module of claim 9, wherein the connector is secured within the alignment guide via mechanical interference without the use of adhesive or epoxy.

13. The optoelectronic module of claim 9, wherein prior to insertion of the connector into the alignment guide, the optoelectronic module is tested without the connector.

14. The optoelectronic module of claim 9, further comprising a transmitter array and a receive array both disposed on a side of the lens block opposite the alignment guide, wherein the connector, alignment guide and lens block cooperate to align each transmitter of the transmitter array and each receiver of the receiver array with a corresponding one of the plurality of optical fibers.

15. The optoelectronic module of claim 9, wherein the optoelectronic module is substantially compliant with the QSFP MSA or the CXP MSA.

16. The optoelectronic module of claim 9, wherein an effective module length of the optoelectronic module is approximately 70 millimeters, the effective module length being defined as a longitudinal distance beginning from where the optoelectronic module extends outside of a host device to where the multi-fiber communication cable bent at its minimum fiber bend radius is substantially normal to a length of the optoelectronic module.

17. An active cable comprising:
a multi-fiber communication cable comprising a plurality of optical fibers, the multi-fiber communication cable having first and second ends; and
first and second optoelectronic modules attached to the first and second ends of the multi-fiber communication cable, respectively, each of the first and second optoelectronic modules comprising:
 a housing comprising a top shell and a bottom shell;
 a printed circuit board at least partially enclosed within the housing;
 a transmitter array and a receiver array in electrical communication with the printed circuit board;
 a lens block enclosed within the housing;
 an alignment guide configured to align the plurality of optical fibers with the transmitter array and receiver array in cooperation with the lens block and a connector; and
 the connector, the connector being permanently attached to the multi-fiber communication cable and permanently received within the alignment guide, the connector comprising:
  a connector housing having inner and outer surfaces extending between forward and rear ends of the connector housing, wherein the inner surfaces define a passageway extending lengthwise between the forward and rear ends;

a ferrule mounted upon end portions of the plurality of optical fibers, the ferrule disposed partially within the passageway defined by the connector housing; and a crimp ring at least partially encompassing the rear end of the connector housing and an exposed jacket of the multi-fiber communication cable, the exposed jacket being at least partially disposed between the crimp ring and the rear end of the connector housing.

18. The active cable of claim 17, wherein an effective module length of the first or second optoelectronic modules is approximately 70 millimeters.

19. The active cable of claim 17, wherein an effective module length of the first or second optoelectronic modules is approximately 8 millimeters less than an otherwise comparable optoelectronic module that implements an MTP connector to attach to a multi-fiber communication cable.

20. The active cable of claim 17, wherein each of the first and second optoelectronic modules is substantially compliant with the QSFP MSA or the CXP MSA.

\* \* \* \* \*

UNITED STATES PATENT AND TRADEMARK OFFICE
CERTIFICATE OF CORRECTION

PATENT NO.        : 9,081,156 B2
APPLICATION NO.   : 12/717352
DATED             : July 14, 2015
INVENTOR(S)       : Togami et al.

It is certified that error appears in the above-identified patent and that said Letters Patent is hereby corrected as shown below:

Specification

In Column 1, Line 18, delete "2009." and insert -- 2009, now Pat. No. 8,391,667. --, therefor.

In Column 8, Line 66, delete "protrusion 524" and insert -- protrusion 522 --, therefor.

Signed and Sealed this
Fifth Day of July, 2016

Michelle K. Lee
*Director of the United States Patent and Trademark Office*